Feb. 21, 1967 H. R. HILSTROM 3,305,103
DEVICE FOR FEEDING A WORK PIECE INTO A FABRICATING MACHINE
Filed May 12, 1965 2 Sheets-Sheet 1
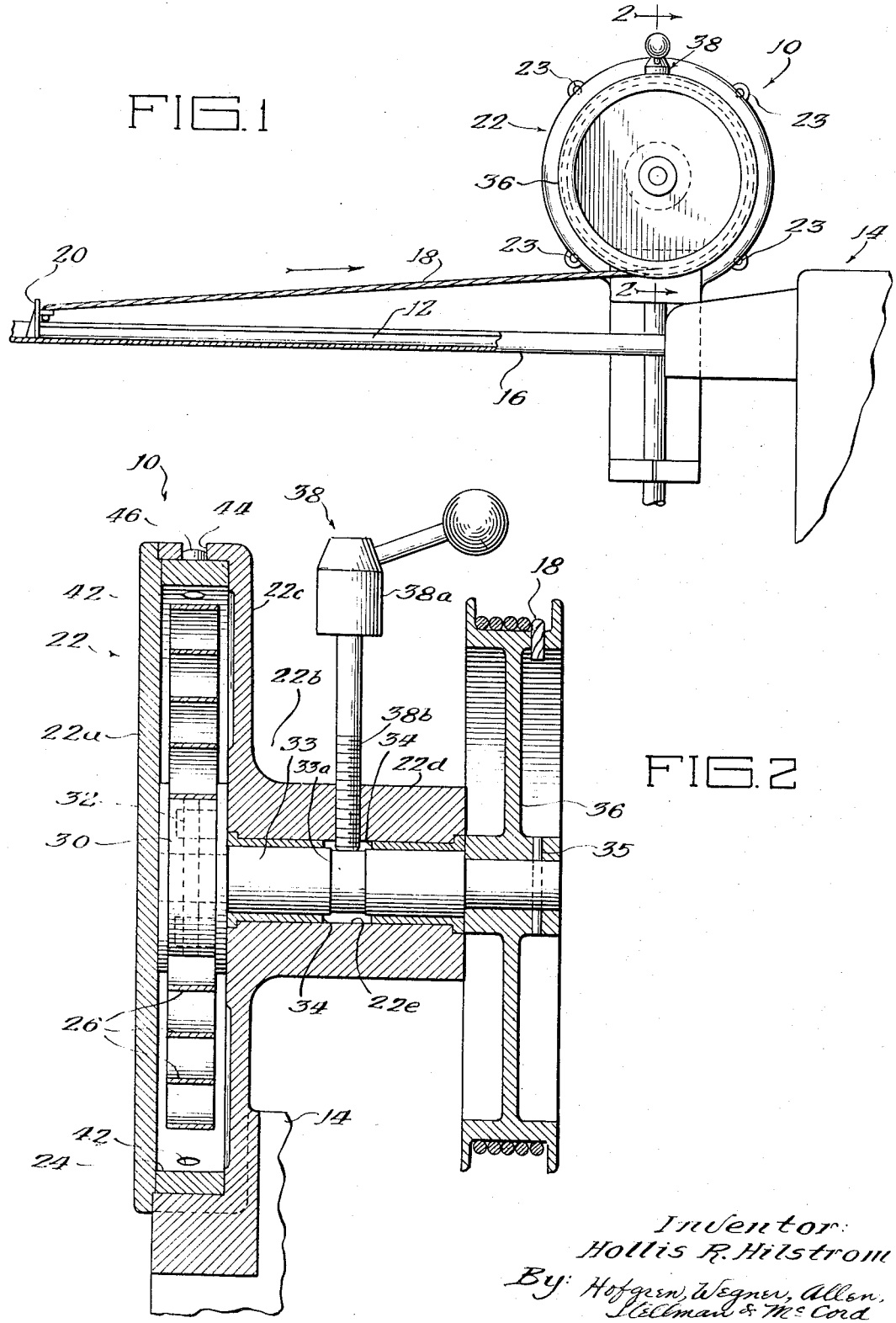
Inventor:
Hollis R. Hilstrom
By: Hofgren, Wegner, Allen,
Stellman & McCord
Attorneys though in the above description of the operation of the device the ring 24 is described as being movable to alter the spring tension, it will be equally obvious that the reel 30 could be moved to accomplish the same purpose, without departing from the scope and spirit of this invention.

United States Patent Office 3,305,103
Patented Feb. 21, 1967

3,305,103
DEVICE FOR FEEDING A WORK PIECE INTO A FABRICATING MACHINE
Hollis R. Hilstrom, 777 Park Ave., Sycamore, Ill. 60178
Filed May 12, 1965, Ser. No. 455,163
2 Claims. (Cl. 214—1.5)

This invention relates to feeding devices and more particularly to a new and improved device for constantly feeding a work piece into a fabricating machine.

There are several fabricating machines which perform operations on a work piece in the form of a bar or a rod to produce a finished product such as a nail, a screw, or the like. Typically the work piece is fed up against a stop member and a portion of the work piece is severed and then worked upon to produce the finished product. The work piece is then advanced a short distance to the stop means and the cycle repeated. Previous devices for feeding a work piece into a fabricating machine have utilized a pulley and a cable wrapped around a pulley with weights connected to one end of the cable. This has proved to be an unsatisfactory apparatus because the combination of the weights and the intermittent feeding of the work piece results in jerky feeding of the work piece which reduces the efficiency of the fabricating machine. Furthermore, the use of weights presents a safety hazard for on occasion the cables have broken, with the weights falling freely on the floor. Other means for feeding the work piece into the fabricating machine have included a form of mechanical finger feeding or have utilized fluid/air powered cylinders which possess the similar shortcomings of a jerky feed as well as being a rather expensive apparatus for accomplishing this purpose.

This invention provides a resilient spring actuated means for evenly and smoothly feeding a work piece into a fabricating machine. The pulley is mounted on a shaft which is connected to a spring so that when the cable is unwound from the pulley, stress is induced in the spring, creating the rearward pull on the cable which is utilized to feed the work piece into the fabricating machine.

It is a general object of this invention to provide a new and improved means for feeding a work piece into a fabricating machine.

It is a primary object of this invention to provide a new and improved means for feeding a work piece into a fabricating means, which feeding means is infinitely adjustable for different feeding conditions and which gives an even and constant feed of the work piece into the fabricating machine.

Other objects, features and advantages of the present invention will be apparent from the following description of the preferred embodiments illustrated in the accompanying drawings, in which:

FIGURE 1 is a fragmentary side elevational view showing the feeding of a work piece into a fabricating means through the use of the feeding means of this invention;

FIGURE 2 is a section view through the feeding means taken along the line 2—2 of FIGURE 1;

Figure 3:
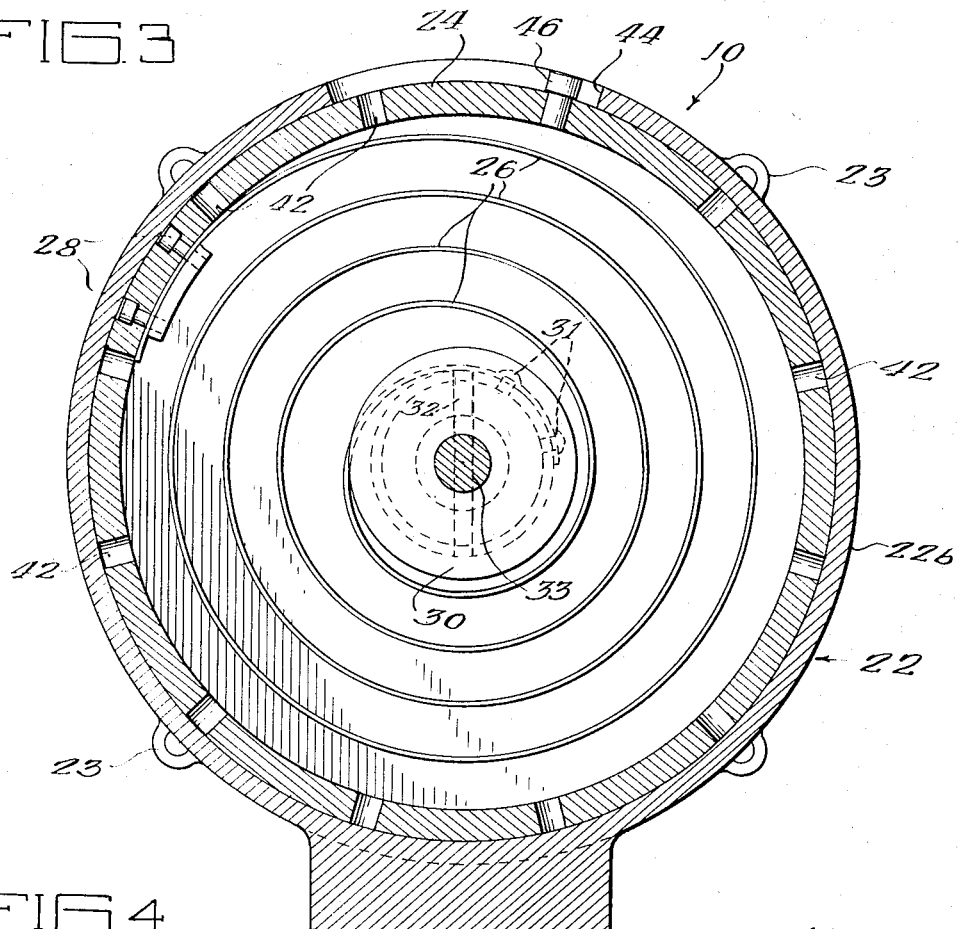
FIGURE 3 is a section view taken along the line 3—3 of FIGURE 2.
Figure 4:
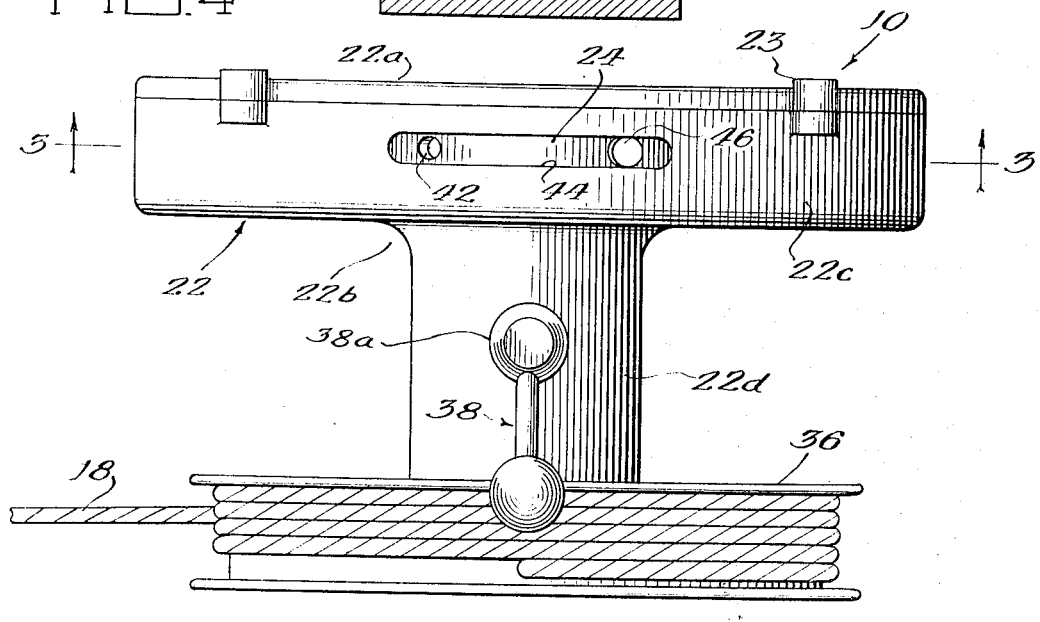
FIGURE 4 is a top plan view of the feeding means of this invention.

Referring now to the drawings, the feeding means 10 of this invention is utilized in feeding a work piece 12, such as a generally cylindrical piece of bar stock material, into a fabricating machine 14 wherein it may be formed into threaded fasteners or the like. Typically the work piece rests in a trough-like or slotted tube guide 16 and is pulled along by a cable 18 which has a suitable block-like attachment 20 at the free end thereof for abutting the free end of the work piece and pushing the work piece into the fabricating machine responsive to a pull on the cable.

Included in the feed means 10 is a support means or a housing 22, which in the preferred embodiment includes a generally flat, disc-like rear cover plate 22a and a forward member 22b secured to the plate 22a by means, such as bolts 23. Forward member 22b has a generally hollow dished portion 22c which forms a cavity with the rear plate when the forward member and rear plate are assembled as a unit. Forward member 22b is further provided with an outwardly projecting hub 22d with a longitudinally extending bore 22e formed therein. The enclosure afforded by the portions 22a and 22b of the housing provides a space for the reception of a ring 24 which floats freely within the space. A torsion spring 26 comprising a generally flat strip of spring metal is attached at one end to the ring 24 by suitable fasteners 28 and is convoluted upon itself a pluarity of times within the ring and attached at its other end to a reel 30 by a suitable fastening means 31. The reel 30 is fixed by pin 32 to a shaft 33 which is rotatable in bushings 34 mounted in the longitudinal bore 22e. Preferably the mounting of the reel 30 places it concentrically within the ring 24.

At the other end of the shaft 33, a pin 35 is used to secure a pulley 36 to the shaft 33. The cable 18 is wound about the pulley 36 so that as the cable 18 is pulled outwardly from the pulley to a point where the block 20 may abut the end of a work piece, this will cause rotation of the shaft 33 and the reel 30 which, in turn, will tighten the spring 26. Thus the spring is automatically pretensioned by the extension of the cable 18 and will exert a constant retracting force upon the cable tending to smoothly and evenly constantly feed the work piece 12 into the fabricating machine 14.

The shaft 33 has a reduced portion 33a intermediate the ends thereof which serves as a brake surface. A brake means 38 including a handle 38a and a threaded shank 38b is threadably received in the hub portion 22d adjacent the reduced diameter portion 33a. Rotation of the handle will cause the shank 38b to be threaded inwardly into engagement with the reduced portion 33a or outwardly out of engagement and therefore prevent rotation of the pulley responsive to the urging of the spring or release the device, as desired.

This feed means is further provided with means for varying the tension of the spring, and therefore, the force exerted by the cable. To this end, the ring is provided with a plurality of the circumferentially spaced openings 42. The housing is provided with an arcuate slot 44 in the top thereof and at least one pin 46 is provided in one of the openings 42 in the ring. As shown in Figure 3, the pin 46 will abut the sides of the slot 44 and prevent the ring from rotating in the direction of the tensioning of the spring. To pre-tension the spring tighter to give a greater feeding force, the ring may be turned to the left, as shown in Figure 3, by grasping the pin 46 and moving it toward the left which will then present another opening 42 in the area of the slot 44 previously occupied by the pin 46. This next opening 42 may be grasped by a suitable tool or another pin and in this manner the ring may be continually pulled in a counterclockwise direction until the desired amount of pre-tensioning has been achieved. Then the pin 46 is placed in the opening 42 most closely adjacent to the right hand edge of the slot 44 and in this manner the feeding means is suitably pre-tensioned. This means of changing the pulling force of the cable does not require additional components as did the former practice of adding more weights to the cable. Moreover, whereas in former feeding devices the pulling force of the cable could be changed in only limited or relatively wide increments of values, with this invention the amount of tension which may be induced in the spring is widely variable resulting in a far greater number of increments of pulling force which may be induced in the cable.

The feed means of this invention is a relatively simple yet extremely efficient structure feeding a work piece into a fabricating machine. The several individual components may be simply and economically produced and very easily assembled. The resultant structure may be mounted on many presently known fabricating machines. Moreover, it possesses the advantages of a constant, even, and smooth feed of the work piece. A widely variable pre-tensioning means for varying the pull on the work piece as desired, and is a relatively safe and simply operated structure.

This mechanical spring-driven feeding device affords an operator of fabricating or screw machines advantages over weight-driven or air/fluid driven feeding devices in that it is faster operating, therefore, less time need be taken from the work cycle for this non-productive part of the machine operation. Weight driven feed devices are governed by the physical laws applicable to falling bodies and air/fluid devices are handicapped by the friction of the flow of the media within the plumbing and variations in pressure at their source. Also, it is more compact, safer, and attractive when installed. It is inexpensive to install and operate and, finally, it is versatile in that with simple adjustment it will feed the lightest to heaviest gauge bars within the machine capacity.

The foregoing detailed description has been given for clearness of understanding only, and no unnecessary limitations should be understood therefrom, as some modifications may be obvious to those skilled in the art.

I claim:

1. Means for feeding a work piece into a fabricating machine, comprising: a housing on said machine, said housing including a first member having a dished portion with an outwardly projecting annular wall and a boss protruding centrally from the side of the dished portion opposite said annular wall open end, said boss having a centrally formed bore and said annular wall having an opening in a portion thereof; said housing further including a second substantially flat plate member secured over the open end of said dished portion to form a cavity therewith; a shaft rotatably mounted in the bore of said boss; a pulley wheel mounted on one end of the shaft adjacent the boss, said wheel having a cable wrapped thereabouts for extension from the wheel to a position of engagement with a work piece; a reel within the cavity secured to the other end of the shaft; a ring-like member mounted in the cavity concentric to the reel and closely adjacent to the annular wall of the cavity, said member having a plurality of openings therein and being movable relative to the reel and movable relative to the support; a torsion spring in the cavity secured to the reel at one end and to the ring-like member at the other end, rotation of the pulley responsive to the extension of the cable causing the shaft to turn the reel and induce stress in the spring so that the extended cable, when attached to a work piece, will urge the work piece into the fabricating machine; and a pin inserted through the opening in the annular wall and through at least one of the opening in the ring to hold the ring against rotation relative to the housing in one direction when stress has been induced in the spring to permit rotation of the ring in the opposite direction for changing the amount of stress in the spring to produce feeding forces of different values for the same distance of extension of the cable.

2. The feeding means of claim 1 including brake means on said housing for holding said shaft against rotation.

References Cited by the Examiner

UNITED STATES PATENTS

| 3,123,052 | 3/1964 | Marshall | 242—107.5 X |
| 3,208,769 | 9/1965 | Onori | 242—107.5 X |

FOREIGN PATENTS

| 596,166 | 8/1925 | France. |
| 646,564 | 7/1928 | —France. |

MARVIN A. CHAMPION, *Primary Examiner.*